US008552857B2

(12) United States Patent
Berezowski et al.

(10) Patent No.: US 8,552,857 B2
(45) Date of Patent: Oct. 8, 2013

(54) FAILSAFE SIGNAL TRANSMISSION FOR WIRELESS SENSOR MESH

(75) Inventors: Andrew G. Berezowski, Wallingford, CT (US); Tim Rauworth, West Chicago, IL (US); Vinayak Sadashiv Kore, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 488 days.

(21) Appl. No.: 12/904,382

(22) Filed: Oct. 14, 2010

(65) Prior Publication Data

US 2012/0092159 A1  Apr. 19, 2012

(51) Int. Cl.
  *G08B 1/08* (2006.01)
(52) U.S. Cl.
  USPC ...... 340/539.22; 340/506; 370/255; 370/311; 370/321; 370/324
(58) Field of Classification Search
  USPC .................. 340/539.22, 286.05, 539.26, 506; 370/294–458, 913, 915; 375/356; 455/502, 561
  See application file for complete search history.

(56) References Cited

U.S. PATENT DOCUMENTS

| | | | | |
|---|---|---|---|---|
| 6,477,183 | B1 * | 11/2002 | Yamamoto | 370/508 |
| 7,450,627 | B2 | 11/2008 | Couch et al. | |
| 7,680,041 | B2 | 3/2010 | Johansen | |
| 7,701,858 | B2 | 4/2010 | Werb et al. | |
| 2002/0105976 | A1 * | 8/2002 | Kelly et al. | 370/519 |
| 2004/0203743 | A1 * | 10/2004 | Macridis et al. | 455/427 |
| 2005/0276255 | A1 * | 12/2005 | Aiello et al. | 370/348 |
| 2007/0201504 | A1 | 8/2007 | Christensen et al. | |
| 2007/0263647 | A1 | 11/2007 | Shorty et al. | |
| 2008/0170511 | A1 | 7/2008 | Shorty et al. | |
| 2008/0291855 | A1 | 11/2008 | Bata et al. | |
| 2009/0082885 | A1 | 3/2009 | Nass | |
| 2010/0045470 | A1 | 2/2010 | Araiza et al. | |
| 2010/0110924 | A1 | 5/2010 | Blum et al. | |
| 2011/0255445 | A1 * | 10/2011 | Johnson et al. | 370/255 |

FOREIGN PATENT DOCUMENTS

WO  WO 01/26068 A1  4/2001

OTHER PUBLICATIONS

European Search Report corresponding to Application No. EP 11 18 4947, dated Dec. 19, 2011.
Ken Biba, An Update to the Hybrid Wireless MAC Protocol Supporting Asynchronous and Synchronous MSDU Delivery Services.
IEEE 802.11 Wireless Access Method and Physical Layer Specifications, Jan. 1992 (pp. 1-20).

* cited by examiner

*Primary Examiner* — Brent Swarthout
(74) *Attorney, Agent, or Firm* — Husch Blackwell LLP

(57) ABSTRACT

An apparatus is provided. The apparatus includes a plurality of transceivers arranged in a mesh network that each synchronously communicate with at least one other of the plurality of transceivers in an assigned slot of a TDMA channel, at least a first of the plurality of transceivers asynchronously transmitting a priority message on a priority channel that is different than the TDMA channel and at least a second of the plurality of transceivers that detects an information content of the asynchronous priority message on the priority channel and retransmits the detected information content synchronously on the TDMA channel to a third transceiver of the plurality of transceivers.

15 Claims, 2 Drawing Sheets

FAILSAFE SIGNAL TRANSMISSION FOR WIRELESS SENSOR MESH

FIELD OF THE INVENTION

The field of the invention relates to wireless sensors and more particularly to wireless sensors for fire detection and/or security systems.

BACKGROUND OF THE INVENTION

Fire detection systems are generally known. Such systems typically include a number of fire detectors distributed throughout a protected space and each connected to a control panel.

The connection between the fire detectors and control panel may be either wired or wireless. Wired systems are expensive to install, but are more failsafe. In the case of a wired system, power may be provided through the wires. Testing of each unit may also be accomplished through the interconnecting wires.

Conversely, wireless systems are cheaper, at least for the point of view that the fire sensors do not require the installation of wiring. Such sensors are typically battery powered and communicate using a low power radio transmitter.

Because of the reliance upon batteries; the transmitters of wireless fire detectors are typically constructed to cycle between a low power state and a higher power state where the transmitter transmits a status signal. In order to accommodate large numbers of sensors, the transmitter of such sensor sometimes operate under a time division multiple access (TDMA) format where each transmitter is assigned to operate on a specific slot of a TDMA channel.

In order to reduce power consumption as much as possible, the time slots are made as short as possible in order to reduce transmitter on-time. Because of the narrow time slots, synchronization of transmitters is important in order to ensure the reliable exchange of information. However, in order to maintain synchronization, an accurate time base is needed within each sensor. Because of the importance of fire detectors, a need exists for more flexible methods of synchronizing such fire detectors.

DETAILED DESCRIPTION OF AN ILLUSTRATED EMBODIMENT

Figure 1:
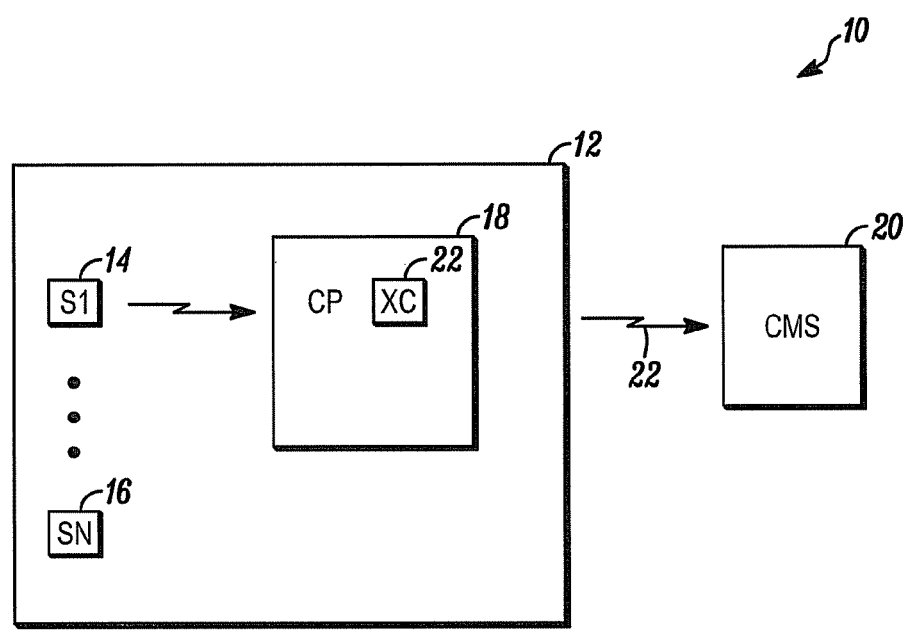
FIG. 1 is a block diagram of a fire detection system in accordance with an illustrated embodiment of the invention.

FIG. 1 is a block diagram of an environmental detection system 10 shown generally in accordance with an illustrated embodiment of the invention. The system 10 includes a number of environmental sensors 14, 16 and a control panel 18. The environmental sensors 14, 16 may communicate with the control panel 18 wirelessly.

The sensors 14, 16 may be distributed throughout a protected region 12. The sensors 14, 16 may operate to detect any of a number of environmental parameters (e.g., heat, smoke, natural gas, etc.).

Upon detecting an alarm condition, the sensors 14, 16 may send an alarm signal to the control panel 18. The control panel 18, in turn, may incorporate the alarm signal into an alarm report 22 transmitted under a wireless or wired format to a central monitoring station 20. The central monitoring station 20 may, in response, summon the appropriate help (e.g., private security personnel, police, fire department, etc.).

The system 10 operates as a mesh network. That is, not all of the sensors 14, 16 are able to detect transmissions from the control panel 18 and the control panel 18 may not be able to detect transmissions from each of the sensors 14, 16. During start up of the system 10, each of the sensors 14, 16 listens for transmissions from the control panel 18 and from other sensors 14, 16. If a sensor 14, 16, detects transmissions from the control panel 18, then that sensor 14, 16 establishes itself as a hub through which transmissions from other sensors 14, 16 (that are further away and cannot detect the control panel 18) may be relayed to the control panel 18 through the hub and visa versa.

Figure 2:
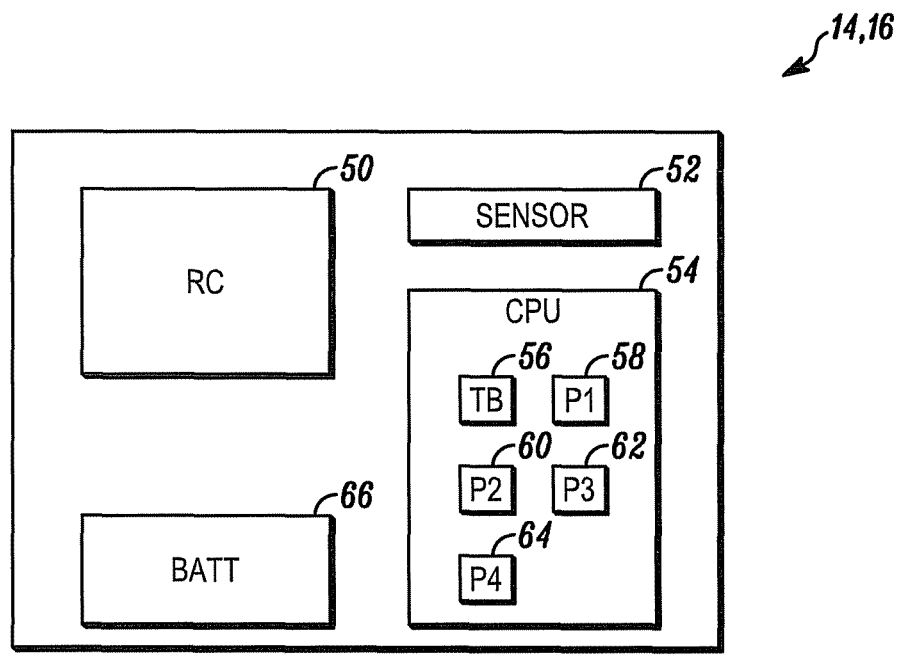
FIG. 2 is a block diagram of a sensor that may be used with the system of FIG. 1.

FIG. 2 is a block diagram of a sensor 14, 16. Included within each of the sensors 14, 16 is a transceiver 50, a sensing device 52, a central processing unit (CPU) 54 and a battery 66.

Figure 3:
FIG. 3 depicts a TDMA frame that may be used by the system of FIG. 1.

The transceiver 50 normally operates under a time division multiple access (TDMA) format such as that shown in FIG. 3. In order to synchronize transmission of the sensors 14, 16, a transceiver 22 associated with the control panel 18 may periodically transmit a synchronization signal in one of the TDMA slots.

The sensors 14, 16 may receive the synchronization signal and align an internal time base (e.g., a clock) 56 to the synchronization signal. Once the internal time base 56 is aligned to the synchronization signal, the sensors 14, 16 are potentially able to transmit in any slot of the TDMA frame shown in FIG. 3.

Since the system 10 operates as a mesh network, not all of the sensors 14, 16 are able to receive the synchronization signal directly from the control panel 18. In these cases, the hub transceivers 14, 16 retransmit the synchronization signal for the benefit of sensors 14, 16 who are further away. In this way the synchronization signal may be propagated to sensors 14, 16 that are located in the furthest reaches of the protected area 12.

The sensors 14, 16 may each be assigned to operate within a particular slot of the TDMA frame and to periodically transmit a status message to the control panel within that slot. The transmissions may be direct (for hub sensors 14, 16) or one or more hub sensors 14, 16 may receive, detect an information content of transmissions in the assigned slot of another, more distant sensor 14, 16 and retransmit the information content to the control panel 18 in the assigned slot of the hub sensor 14, 16. Alternatively, the control panel 18 may periodically poll each of the sensors 14, 16 and each sensor may transmit a response within the assigned slot.

The sensors 14, 16 may transmit alarm messages based upon an environmental parameter detected by the sensing device 52. Alternatively, the sensors 14, 16 may transmit status information such as a low battery notification detected by a processor 64.

Under one illustrated embodiment of the invention, the TDMA frame of FIG. 3 is used for normal system traffic and on a TDMA channel frequency. For example, a group of slots (e.g., slots S1 to N+3) are designated for synchronous transmission of data while at least one priority channel (different in frequency from the TDMA channel) is designated for asynchronous transmission of data.

During operation, a processor 58 of the CPU 54 of each of the sensors 14, 16 monitors (i.e., compares) the received synchronization signal with the state of its own time base to determine a synchronization error. Synchronization error in this case means the time difference between the predicted temporal location of the synchronization signal from the time base compared to the actual time of receipt of the synchronization signal from the control panel 18. If the synchronization error is greater than some threshold value, the CPU 54 of the sensor 14, 16 determines that it is not synchronized with the control panel 18.

If the synchronization error of a sensor 14, 16 is less than the threshold value, then a second processor 60 of the sensor 14, 16 communicates with the control panel 18 synchronously in one of the TDMA slots. If the synchronization error of a sensors 14, 16 is equal to or greater than the threshold value, then the second processor 60 of the sensor 14, 16 communicates with the control panel 18 asynchronously in the at least one priority channel.

In order to facilitate communication between unsynchronized sensors 14, 16 and the control panel 18, a third processor 62 of the synchronized sensors 14, 16 monitors the priority channels for asynchronous transmissions from unsynchronized sensors 14, 16. The information content of any asynchronous transmission in one of the priority channels that is detected by a synchronized sensor 14, 16 is then repeated by retransmitting the information synchronously by the detecting sensor 14, 16 in one of the TDMA slots.

During normal operation, a processor within each of the sensors 14, 16 detects a signal from the sensor device 52 indicative of a selected environmental parameter (e.g., smoke, heat, natural gas, etc.). The processor may continuously compare the detected signal with one or more threshold values. If the detected signal exceeds the threshold, then the processor may transmit an alarm signal (packet) to the control panel 18. The alarm packet may include an identifier of the control panel 18, unique identifier of the sensor 14, 16 and an identifier of the type of detected alarm condition.

If the sensor 14, 16 is synchronized with the control panel 18, then the sensor 14, 16 transmits the alarm signal within its assigned slot synchronously with the slot boundaries. If the sensor 14, 16 is not synchronized, then the sensor 14, 16 transmits the alarm signal asynchronously in one of the priority slots.

Alternatively, the sensor 14, 16 may simultaneously transmit the alarm signal both synchronously and asynchronously. In this way, the odds of the alarm signal reaching the control panel 18 are maximized. Under this scenario, the sensor 14, 16 transmits the alarm signal in its assigned slot. If the alarm signal in the assigned slot is received by the control panel 18, the control panel 18 acknowledges the alarm signal by transmitting a response to the activated sensor 14, 16.

In this case, the activated sensor 14, 16 also continuously transmits the alarm signal on the priority channels. Upon detection of the alarm signal by a hub or other sensor 14, 16, the hub or other sensor 14, 16 forwards the alarm signal to the control panel 18. Once received by the control panel 18, the control panel sends an acknowledgement to the activated sensor 14, 16 asynchronously on the priority channel through the detecting hub or other sensor 14, 16.

In order to facilitate the reporting of alarm conditions, each sensor 14, 16 monitors the one or more priority channels and if it detects the asynchronous transmission of information, the detecting sensor 14, 16 retransmits the detected information in its assigned synchronous slot. This also allows for the possibility that at least two sensors 14, 16 could be transmitting simultaneously on the same priority channel. If this is the case, then it is more likely that other sensors 14, 16 will separately detect the two asynchronous transmissions (based upon differences in location and signal level) and retransmit the detected information on two different synchronous slots.

Alternatively, a hub sensor 14, 16 may detect an information content of the alarm signal on a priority channel and retransmit the information content to the control panel 18 on the priority channel. In this case, the control panel 18 may send a response to the hub sensor 14, 16 within an assigned slot on the TDMA channel.

Moreover, if a sensor 14, 16 has lost synchronism, then it is possible that the battery of the sensor 14, 16 is near exhaustion and the sensor 14, 16 is transmitting at a low power level. The low power level reduces the possibility that the control panel 18 will directly detect the asynchronous transmissions. The detection and retransmission of the asynchronous transmissions of information by nearby synchronized sensors 14, 16 increases the possibility that a sensor 14, 16 with a near depleted battery will still be able to report alarm conditions.

A specific embodiment of an environmental monitoring system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. An apparatus comprising:
    a control panel of a security system;
    a plurality of transceivers of the security system, wherein during start up of the security system, each of the plurality of transceivers listen for wireless transmissions from the control panel and from other transceivers of the plurality of transceivers, wherein at least some of the plurality of transceivers detect wireless transmissions from the control panel and each establishes itself as a hub transceiver through which wireless transmissions from other transceivers that are further away and cannot detect the control panel are relayed to the control panel through the hub transceiver and visa versa, the at least some hub transceivers each synchronously communicate with the control panel of the security system in an assigned slot of a TDMA channel;
    at least a first of the plurality of transceivers not able to detect the control panel asynchronously transmitting a priority message on a priority channel that is different than the TDMA channel; and
    at least a second of the plurality of transceivers established as a hub transceiver that detects an information content of the asynchronous priority message on the priority channel and retransmits the detected information content synchronously on the TDMA channel to the control panel.

2. The apparatus as in claim 1 further comprising the first transceiver also transmitting the priority message on an assigned slot of the TDMA channel.

3. The apparatus as in claim 1 wherein at least some of the plurality of transceivers further comprise environmental sensors.

4. The apparatus as in claim 1 further comprising a a processor of each of the plurality of transceiver that couples the transceiver to the control panel via the TDMA channel either directly or through another of the plurality of transceivers.

5. The apparatus as in claim 4 further comprising a synchronization signal transmitted by the control panel to each of the plurality of transceivers either directly or through another of the plurality of transceivers.

6. The apparatus as in claim 4 further comprising a central monitoring station that receives alarm messages through the control panel from the plurality of transceivers.

7. A method comprising:
a control panel of a security system providing a TDMA communication channel having a plurality of slots for synchronous transmission of information from a plurality of transceivers of the security system;
the control panel providing at least one priority channel that is different than the TDMA channel for priority transmissions;
during start up of the security system, each of the plurality of transceivers listening for transmissions from the control panel and from other transceivers of the plurality of transceivers;
at least some of the plurality of transceivers detecting transmissions from the control panel and each establishing itself as a hub transceiver through which transmissions from other transceivers that are further away and cannot detect the control panel are relayed to the control panel through the hub transceiver and visa versa;
synchronizing each of a plurality of transceivers that detected the control panel with an assigned one of the plurality of slots;
one of the plurality of transceivers losing synchronization with the slots;
the one transceiver transmitting a signal asynchronously on the priority channel;
another of the plurality of transceivers established as a hub transceiver and synchronized with the slots detecting the asynchronously transmitted signal on the priority channel; and
the other transceiver re-transmitting the detected signal synchronously in the assigned one of the plurality of slots.

8. The method of claim 7 further comprising defining the plurality of transceivers as a fire alarm system.

9. The method as in claim 8 further comprising coupling at least one of the plurality of transceivers to a fire detector.

10. The method as in claim 9 wherein the control panel further comprises a fire alarm control panel detecting transmissions from the transceivers on the TDMA communication channel.

11. The method as in claim 10 further comprising a transmitter of the fire alarm control panel transmitting a synchronization signal for the benefit of the plurality of transceivers.

12. The method as in claim 11 further comprising assigning each of the plurality of transceivers to a different slot of the plurality of slots.

13. An apparatus comprising:
a control panel of a security system;
a plurality of environmental sensors of the security system wherein during start up of the security system, each of the plurality of environmental sensors listen for transmissions from the control panel and from other environmental sensors of the plurality of environmental sensors, wherein at least some of the plurality of environmental sensors detect transmissions from the control panel and each establishes itself as a hub environmental sensor through which transmissions from other environmental sensors that are further away and cannot detect the control panel are relayed to the control panel through the hub environmental sensors and visa versa, each of the plurality of environmental sensors that detect transmissions from the control panel is assigned to synchronously exchange a communicated signal within one of a plurality of slots of a TDMA channel and alternatively where not able to detect transmissions from the control panel to asynchronously transmit a signal within a priority channel that is different than the TDMA channel wherein each of the plurality of environmental sensors further comprise:
a first processor that detects asynchronous transmissions of information on the priority channel and retransmits the detected information synchronously in the assigned slot;
a second processor that detects loss of synchronization; and
a third processor that transmits an asynchronous signal in response to loss of synchronization on the priority channel.

14. The apparatus as in claim 13 further comprising an alarm system.

15. The apparatus as in claim 14 wherein the control panel further comprises a control panel that exchanges the communicated signals with the plurality of sensors through the slots.

* * * * *